(12) United States Patent
Connor

(10) Patent No.: US 11,501,469 B2
(45) Date of Patent: Nov. 15, 2022

(54) DATA GENERATION SYSTEM AND METHODS

(71) Applicant: Sony Interactive Entertainment Inc., Tokyo (JP)

(72) Inventor: Patrick John Connor, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 143 days.

(21) Appl. No.: 16/650,205

(22) PCT Filed: Sep. 12, 2018

(86) PCT No.: PCT/GB2018/052589
§ 371 (c)(1),
(2) Date: Mar. 24, 2020

(87) PCT Pub. No.: WO2019/063968
PCT Pub. Date: Apr. 4, 2019

(65) Prior Publication Data
US 2020/0279405 A1  Sep. 3, 2020

(30) Foreign Application Priority Data
Sep. 29, 2017 (GB) ..................................... 1715798

(51) Int. Cl.
| G06T 9/20 | (2006.01) |
| H04N 19/114 | (2014.01) |
| H04N 19/177 | (2014.01) |
| H04N 13/161 | (2018.01) |

(52) U.S. Cl.
CPC ............. *G06T 9/20* (2013.01); *H04N 13/161* (2018.05); *H04N 19/114* (2014.11); *H04N 19/177* (2014.11)

(58) Field of Classification Search
CPC .. H04N 19/114; H04N 19/117; H04N 13/161; G06T 9/20

USPC .......................................................... 382/243
See application file for complete search history.

(56) References Cited

FOREIGN PATENT DOCUMENTS

| WO | 2015070231 A1 | 5/2015 |
| WO | 2017139789 A1 | 8/2017 |

OTHER PUBLICATIONS

International Search Report and Written Opinion for corresponding PCT Application No. PCT/GB2018/052589, 17 pages, dated Dec. 5, 2018.

(Continued)

*Primary Examiner* — On S Mung
(74) *Attorney, Agent, or Firm* — Matthew B. Dernier, Esq.

(57) ABSTRACT

A data generation system for generating data representing content to be displayed includes: a content dividing unit operable to divide content to be displayed into a plurality of polyhedra and generate polyhedron position information, an intersection detecting unit operable to generate intersection information that describes the intersection of one or more surfaces within the content with the plurality of polyhedra, a polyhedron classifying unit operable to classify each of the polyhedra in dependence upon the intersection information, the classification indicating the properties of the surface within the respective polyhedra, and a data generating unit operable to generate data comprising the polyhedron position information and the polyhedron classification information.

14 Claims, 10 Drawing Sheets

(56) References Cited

OTHER PUBLICATIONS

Shi-Nine Yag, et al., "Compressing Isosurfaces Generated with Marching Cubes" Visual Computer vol. 18, No. 1, pp. 54-67, Jan. 24, 2002.
Rephael Wenger., "Chapter 9: Multiresolution Tetrahedal Meshes" In: "Isosurfaces : Geometry, Topology, and Algorithms" pp. 281-316, Jun. 24, 2013.
Saied Moezzi, et al., "Interactive Three Dimensional Digital Video in MPEG-4", 35, Visual Computing Laboratory pp. 1-14, Apr. 11, 1996.
Aditya Mavlankar, et al., "Video Streaming with Interactive Pan/Tilt/Zoom" In: "Digital Video and Audio Broadcasting Technology: A Practical Engineering Guide (3rd edition)", pp. 431-455, Jan. 1, 2010.
Search Report for corresponding GB Application No. GB 1715798.3, 1 pages, dated Mar. 6, 2018.
Examination Report for corresponding GB Application No. GB 1715798.3, 2 pages, dated Aug. 27, 2019.
Communication Pursuant to Article 94(3) for corresponding EP Application No. 18773556.8, 4 pages, dated Apr. 19, 2022.

| ID Information | Location Information | Cube Information | Additional Data |
|---|---|---|---|
| 410 | 420 | 430 | 440 |

400

| ID Information | Location Change Information | Cube Change Information | Additional Change Information |
|---|---|---|---|
| 610 | 620 | 630 | 640 |

600

Scene Information 1100

View point Information 1110

DATA GENERATION SYSTEM AND METHODS

BACKGROUND OF THE INVENTION

Field of the Invention

This disclosure relates to data generation systems and methods.

Description of the Prior Art

In recent years there has been a drive to provide ever higher quality video and image content to users in order to enhance their viewing experience. This is particularly true of immersive content, such as virtual reality experiences, that may be provided using a television capable of displaying three-dimensional images or using a head-mountable display (HMD) system. Immersive content may require a much higher quality of content to be used than other types of content, as it is intended that the user is unable to be able to tell that they are viewing a virtual environment. In addition to this, immersive content is often interactive so as to increase the user's sense of being in the virtual environment.

However, with the increase in the quality of such content the file size and bandwidth requirements for storing and transmitting the content have become increasingly demanding. This may prevent a user from utilising the highest-quality content available, as the user may not have sufficient local storage space available (for example, for playback on mobile devices) or an available network connection may not be sufficiently high-bandwidth to stream the content to a wireless (or even wired, in extreme cases) display device.

It is therefore advantageous to be able to provide a method of storing such content in an efficient manner, so as to reduce a file representing the content to an acceptable data size. In previously proposed arrangements this has led to the adoption of increasingly efficient video codecs, such as the High Efficiency Video Coding (HEVC) scheme that may be used in place of Advanced Video Coding (AVC). Alternatively, or in addition, increasingly effective data compression techniques may be employed to compress the generated files even further.

While these measures may be sufficient for a range of non-interactive video content, the demands of interactive content may be significantly higher. For example, rather than providing a video with a single viewpoint it may be necessary to provide a dynamic viewpoint that is responsive to user input or the like. Therefore even an efficient coding of the plurality of streams that may be required to provide content may still create implementation problems. It is in view of this problem that the arrangement described in the present disclosure arises.

SUMMARY OF THE INVENTION

Various aspects and features of the present disclosure are defined in the appended claims and within the text of the accompanying description and include at least a data generation system and a method of operating a data generation system as well as a computer program.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
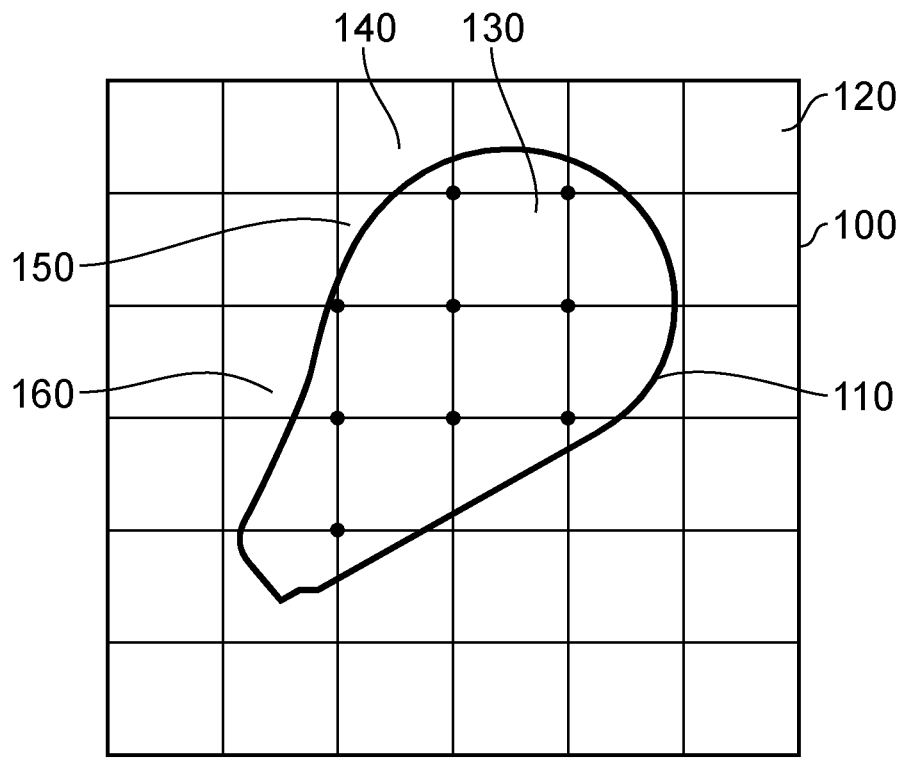
FIG. 1 schematically illustrates a two-dimensional shape.

Referring now to the drawings, wherein like reference numerals designate identical or corresponding parts throughout the several views, the present disclosure relates to an arrangement which is operable to utilise a marching cubes algorithm in order to provide a more efficient storage method for storing video and image content. The methods described in the present disclosure may be considered more efficient as they may reduce the amount of data required to store information about a virtual scene. The marching cubes algorithm will be described below, for the purposes of providing background information.

In order to illustrate the algorithm in a clear manner, a two-dimensional analogous algorithm (a 'marching squares' algorithm) is discussed. FIG. 1 shows a shape 110, which is intended for display, on a grid 100 of squares. The shape 110 may be stored as a two-dimensional scalar field, for example, or as a mathematical function that describes the shape of the perimeter.

In a first step, it is detected whether the vertices of each of the squares in the grid 100 are within the shape or outside of it. Those vertices that are within the shape 110 are identified with black circles in FIG. 1. This detection may be performed by defining a function or set of coordinates that define the perimeter of the shape 110, and then comparing the coordinates of each vertex with the perimeter information. Any vertex that has coordinates that lie within the shape 110 may be identified as such.

The results of this detection may be represented by a 4-bit binary string for each square; for example, if the corner of a square (an intersection of the grid) is within the shape, a '1' is assigned for that corner and if outside, a '0'. In this way, '1010' may be used to indicate that two corners of a square are within the shape, and two outside; the specific corners may be determined in dependence upon the listing convention applied.

For example, using a convention in which the first bit represents the bottom left corner and proceeds anti-clockwise, a square 140 would generate the string '0100' and a square 150 would generate the strong '1110'.

In FIG. 1, a square 120 is shown as an example of a square in which no corner falls within the boundary of the shape 110. The square 120 is generally not of interest when generating an image, as it is empty of any surfaces and thus does not contribute to the generated shape.

A square 130 illustrates the converse case; the square 130 has four corners that are each within the boundary of the shape 110. The square 130 is therefore also not generally of interest when rendering an image, as no surfaces pass through it.

The square 140 is shown as an example of a square with a single corner that appears within the boundary of the shape 110. It is therefore assumed that only a small portion of the shape 110 is present within the square 140, as if there were a greater amount of the shape 110 in the square 140 then it would be likely that more of the corners of the square 140 would be within the boundary of the shape.

The square 150 is shown as an example of a square with three corners that each appear within the boundary of the shape 110. In such a square, it is assumed that a large portion of the square 150 is within the boundary of the shape 110.

The square 160 is shown as an example of a square with two corners that each appear within the boundary of the shape 110. In this case, the two corners that lie within the boundary of the shape 110 are joined by a shared side of the square 160; it may be possible that in other examples the corners that lie within the boundary of the shape 110 are arranged opposite one another.

In a next step, an approximation 200 of the shape 110 is drawn based upon the information derived about the squares.

The approximation 200 is a rather rough approximation of the shape 110; one reasons for this is that there is little consideration of how the boundary of the shape 110 varies within each square. Instead, the centre of each side that connects a corner that is within the boundary with a corner that is outside of the boundary is used as an intersection for the boundary of the approximation 200 with the squares in the grid 100.

This approach means that if a single corner of a square is within the boundary of the shape 110, a diagonal line is used that separates this corner from the other corners of the square. A square with two corners within the boundary of the shape 110 has a vertical or horizontal line (depending on which pair of corners is within the boundary) used in the approximation 200.

A more accurate representation of the shape may be acquired using a more complex implementation of this algorithm; for example, linear interpolation may be used to acquire a more accurate intersection point of the side of a square (rather than simply selecting the midpoint each time). Alternatively, or in addition, post-processing may be applied to the generated approximation 200 so as to smooth the edges and reduce the blockiness of the image that is displayed to a viewer.

The 'marching cubes' algorithm may be considered to be a three-dimensional extension of the marching squares algorithm, and as such is useful for generating three-dimensional surfaces for display.

Rather than using a grid of squares as the basis of the image generation, a mesh of cubes is used. Each of the vertices of each cube are categorised in a similar manner to those of the vertices of the squares in the marching squares algorithm. This leads to 256 possible planar cubes (i.e. surfaces that intersect a cube) being defined, as each of the eight vertices may or may not be within the volume of the shape being approximated.

The marching cubes algorithm may be applied to a three-dimensional scalar field, for example, or a set of voxels that are used to define a shape. Rendering from these representations directly may be problematic in some cases, as they are often large data sets and thus the processing required to generate an image for display may be prohibitively slow. Therefore it is advantageous to use an algorithm, such as the marching cubes algorithm, that reduces the data set by approximating a three-dimensional surface from the original data set.

Figure 2:
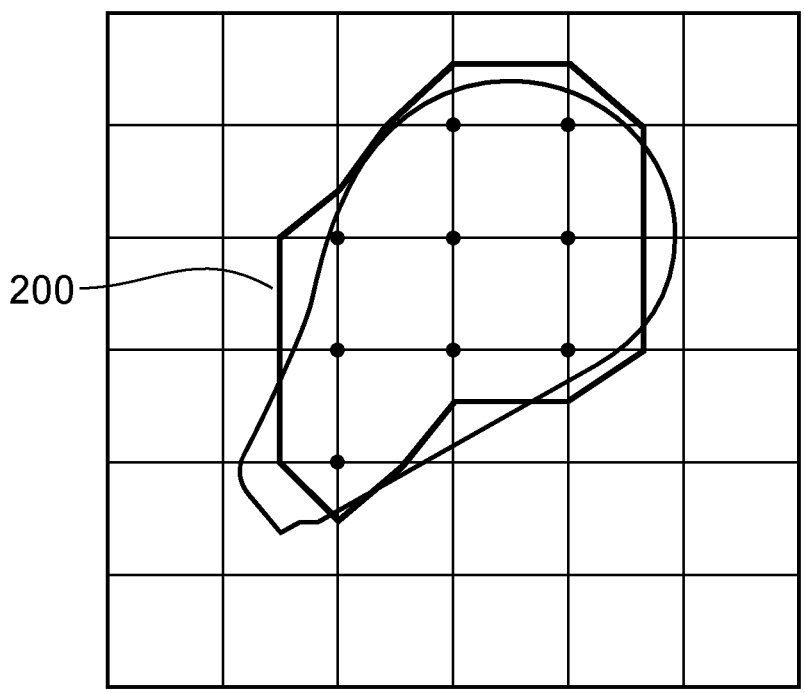
FIG. 2 schematically illustrates an approximation of the two-dimensional shape of FIG. 1.
Figure 3:
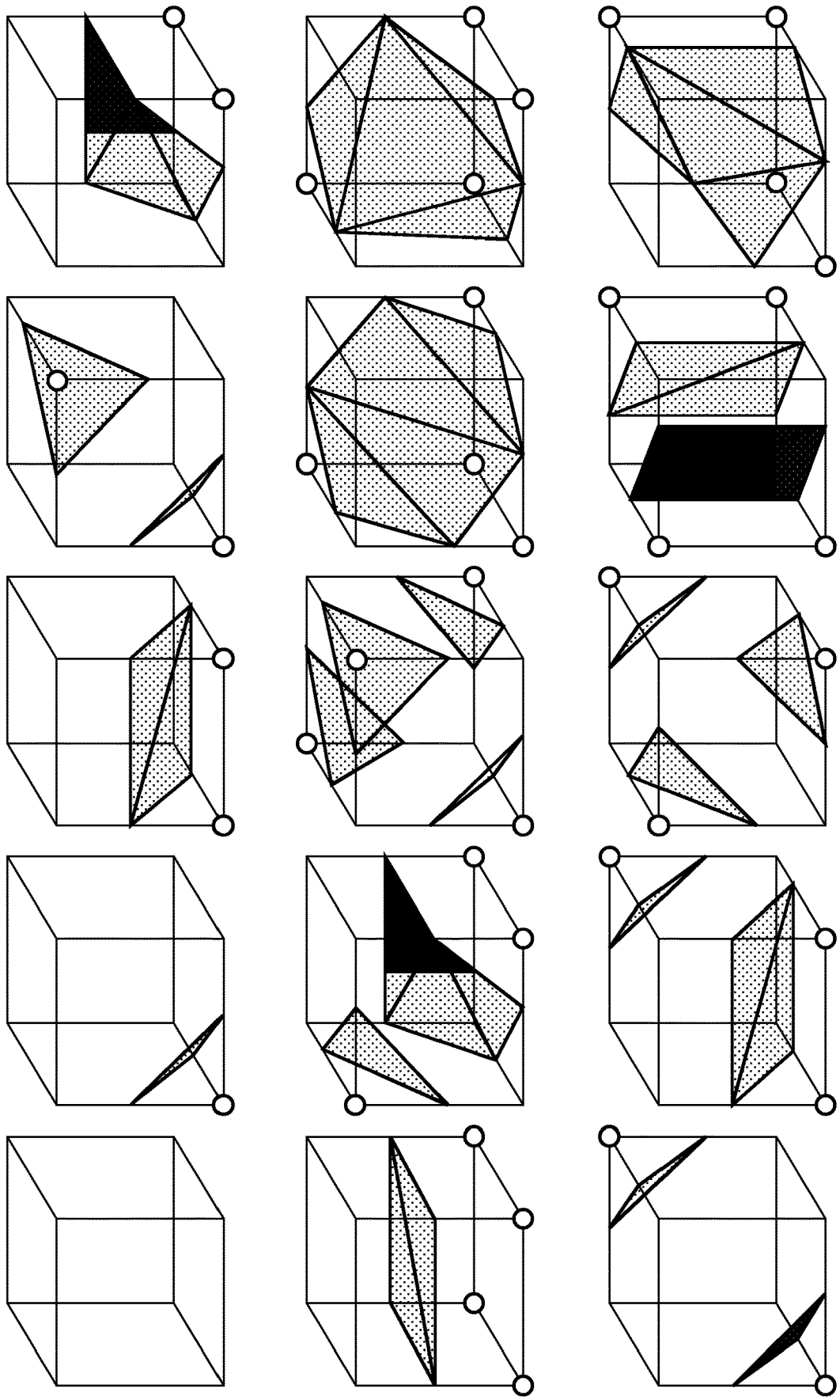
FIG. 3 schematically illustrates cubes used in the marching cubes algorithm.

By exploiting symmetries and the like, such as that of considering the '10000000' case to be a rotated version of the '01000000' case (extending the above 4-bit marching squares notation to eight vertices rather than four), this number is reduced significantly. FIG. 3 illustrates the 15 unique cases that remain after eliminating the redundant configurations. As in FIGS. 1 and 2, the circled vertices are those that are within the shape as defined by the scalar field (or the like).

While using a reduced set of possible cube orientations may be advantageous, in practice it may be simpler to rely on a look-up table of 256 values each corresponding to a different cube in order to reduce the risk of incorrectly oriented surfaces being generated.

By using these cubes, a surface may be constructed that approximates that of an object to be displayed. As discussed above with reference to the marching squares algorithm, post-processing smoothing and the like may be applied in order to reduce the blockiness of the generated images. Additionally, more advanced algorithms may be used so as to generate higher-quality representations. For example, a marching cubes algorithm may be implemented that varies the cube resolution (in effect, the size and number of cubes used in a particular region) in dependence upon local surface complexity; a higher resolution image portion may be generated where a large number of small cubes are used in place of a smaller number of larger cubes.

Alternative, but related, methods to the marching cubes algorithm have also been proposed, such as the marching tetrahedra algorithm. It would be apparent upon reading the present disclosure that the data storage methods described within should not be limited to those based on dividing an image or scene into cubes; instead, it would be apparent that any suitable polyhedron could be used.

While previously proposed arrangements have considered the marching cubes algorithm only as a method for generating images for display from other sources of image data, we present here a method and apparatus for storing and transmitting data using a method based upon the marching cubes algorithm. Such a method may be advantageous in reducing the amount of data required for storing video or image data.

A virtual scene or the like may be divided into a plurality of cubes of a predetermined size, in a manner analogous to the dividing FIG. 1 using the grid 100 of squares. For each of these cubes, data could be stored identifying the type of cube that is an appropriate representation of the surface at that position within the scene. Using the stored data for each of the cubes, it is possible to reproduce a virtual scene for display to a viewer.

However, such a method may be inefficient, as within a scene it may be common for the majority of cubes to either be entirely within a surface or entirely outside a surface. As noted above, information about these cubes is generally considered redundant, as these cubes do not correspond to surfaces within a virtual scene, and as such is not necessary for this information to be stored.

While information may be stored about these in a data-efficient manner (such as leaving the information fields blank for these cubes), it may be more efficient to only provide information about cubes that do form surfaces within the scene.

Examples of storage schemes that may be more efficient include describing a whole scene using a single surface, describing a whole scene using a background surface and one or more separate surfaces that correspond to other objects, or storing information relating only to the surface of each object in an environment. Any locations that do not have a cube defined in these examples may be considered to not correspond to a surface, and thus not be relevant for image reproduction from the generated data storage file. Any suitable combination or other description method may be used in addition (or as an alternative) for describing a scene.

A data storage and transmission method as described in this application may therefore be more efficient than a corresponding method based upon a point cloud or the like. This is because information is generally limited to the surfaces of objects, and do not consider the volume of the objects or the like. In addition, a lower resolution of data may be used (for example, using a single cube in place of a plurality of points in a point cloud).

Figures 4, 5:
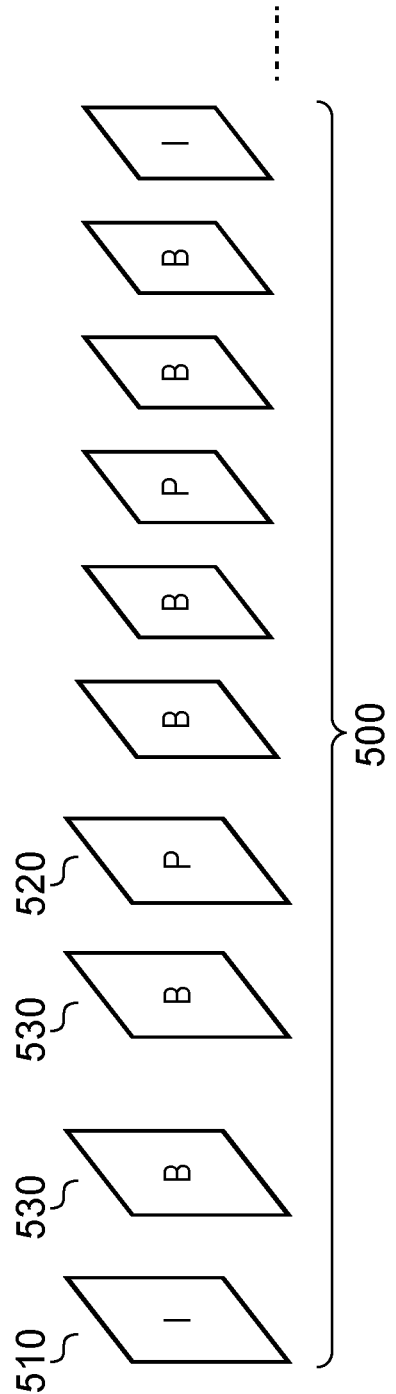
FIG. 4 schematically illustrates a data storage format.
FIG. 5 schematically illustrates a Group of Pictures.

FIG. 4 schematically illustrates a data format suitable for storing such data. This data format 400 includes ID information 410, location information 420, cube information 430 and an additional data field 440. Of course, this should not be seen as limiting—any suitable data format may be used instead of that shown in FIG. 4.

The data structure 400 shown in FIG. 4 may be provided for any suitable quantity of data. For example, a data structure 400 could be provided for each frame of a video, or each keyframe only (with alternative data structures being used for other frames). Alternatively, or in addition, data structures 400 could be provided (with relevant time information, for example) such that each comprises information for a whole scene. In some embodiments, a combination may be used such that static objects in a scene only have information provided on a per-scene basis whilst dynamic objects have information provided on a per-frame basis (for example).

The data structure 400 may also represent any suitable number of cubes; for example, a separate data structure could be provided for each cube in a scene. Alternatively, the data structure 400 may be provided on a per-object basis or a per-scene basis (or any other suitable level of granularity). Of course, a plurality of data structures of differing granularities may be used to represent a scene; for example, a number of cubes may be defined individually whilst other data structures 400 associated with the same scene correspond to each of the cubes for an entire object.

While information may be stored in accordance with this data format for a whole scene, during transmission a smaller set of data (either or both of a reduced-size data structure and a reduced number of structures, as appropriate) may be transmitted for display. For example, only the data corresponding to a particular viewpoint may be transmitted, such as that requested by a viewer in interactive content. In some embodiments, the frustrum associated with an HMD user's viewpoint may be identified, and only information used to define this may be transmitted.

The ID information 410 is used to identify a particular cube; this may be in the form of a numerical identifier or the like, or information that links a particular cube to an object within a scene, for example. Any appropriate identifier may be used, so long as it is possible to identify a particular cube or group of cubes from the ID information 410 and use this to relate the cube(s) to the correction position information and the like.

The location information 420 is used to describe where in the scene a particular cube (or group of cubes) is located. This may be provided using an absolute coordinate system, for example, or using a mapping based upon scene information. For example, a map could be provided for a scene that relates cubes to a location based upon the ID information 410 for the cubes. This map may be provided separately to the data structure 400, in which case the location information 420 is used to identify the map. A separate map may be provided for each object within the scene, for example, or a single map for the whole scene may be provided. The location information may also be implicit in the ordering or sequencing of cubes within the description, or may include an interspersed arrangement of cubes with absolute co-ordinates and cubes defined relative to one or more other cubes or known scene features (such as a scene edge).

The cube information 430 field is used to provide information detailing which cube is the correct cube to use at a particular location. This may comprise a number from 0-255, identifying a particular one of the 256 possible cubes, in addition to any further information that refines the cube—such as interpolation information that varies the surface that is defined. Alternatively, a number from 0-14 may be used to define one of the 15 unique cubes, in conjunction with information defining rotations or the like to acquire the correct cube, in place of the number from 0-255.

The additional data 440 field may be used to communicate further information about the cube. For example, information relating to rendering an image may be included (such as colour or texture information), resolution or cube size information, or information relating to the significance or the like of the cube (for example, information identifying cubes relating to the ball in a sports video as more significant than those representing the crowd).

FIG. 5 schematically illustrates a Group of Pictures (GOP) structure. A GOP 500 generally comprises an intra (I) frame 510, one or more predicted (P) frames 520, and one or more bidirectionally-predicted (B) frames 530. A GOP structure is used in a number of video coding schemes, for the efficient storage and transmission of video data. Such a coding scheme may be employed with the present data structure when used to store video content, in order to further increase the coding efficiency.

An I frame 510 comprises a complete set of information for reproducing a video frame. In the present arrangement, an I frame may take the form of the data structure that is schematically illustrated in FIG. 4, for example.

A P frame 520 is uses predictions based upon an I frame 510 in order to generate a frame for display. That is to say that the P frame 520 comprises information sufficient for generating an image for display only in conjunction with an I frame. A P frame 520 may be obtained by comparing two frames in a video and encoding information about the motion of regions of the frames between the frames, for example. In the present arrangement, two scenes may be compared in order to identify a motion of individual cubes or groups of cubes.

A B frame 530 may use similar prediction methods as a P frame 520, but instead basing the predictions on both an I frame 510 and a P frame 520. B frames 530 may be omitted from a GOP in order to reduce the potential for prediction errors; however such an omission may decrease the encoding efficiency as B frames 530 often comprise less data than I frames 510 and P frames 520.

In some embodiments of the presently disclosed arrangement, only a single type of predicted frame may be used. This is because the location of the cubes (and other features) may be described efficiently using only P frames, for example.

Figures 6, 7:
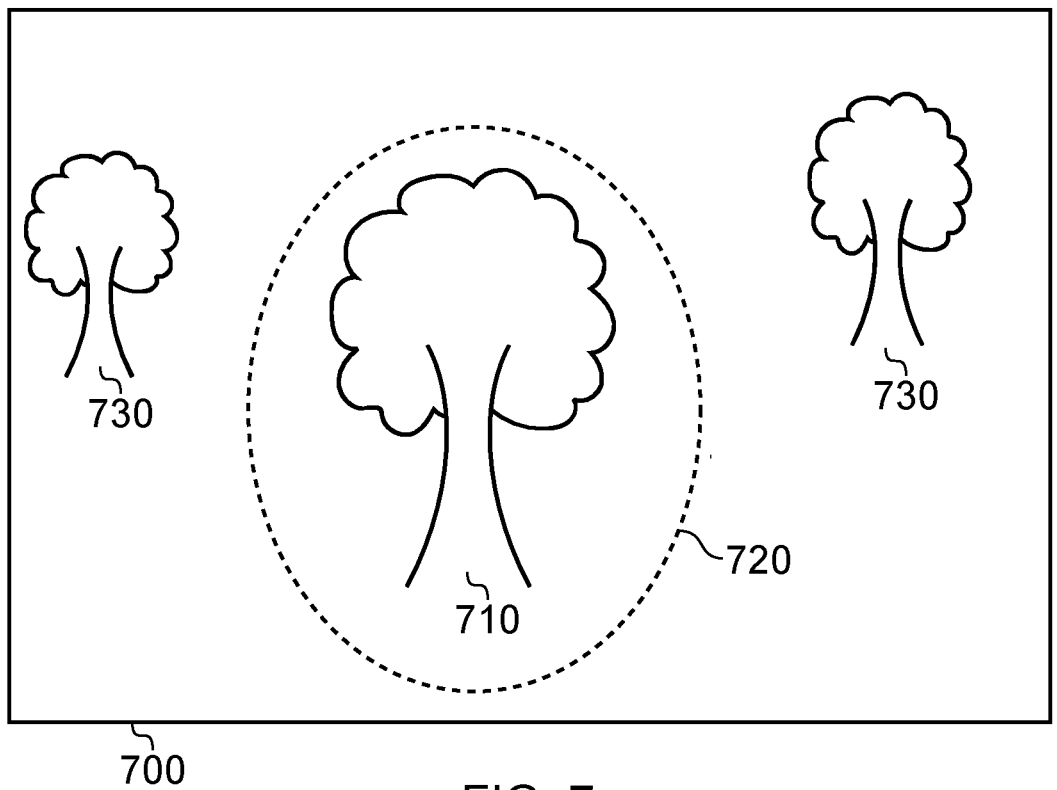
FIG. 6 schematically illustrates an additional data storage format.
FIG. 7 schematically illustrates foveal rendering.

FIG. 6 schematically illustrates a data structure 600 suitable for use as a P frame 520 or a B frame 530. The data structure 600 comprises fields for ID information 610, location change information 620, cube change information 630 and any additional change information 640. In some embodiments, a single data structure 600 is used to represent each of the cubes in a frame, or only those cubes that have changed since the previous frame. In some embodiments, a plurality of data structures 600 are used to represent different portions of the frame; for example, on a per-region or per-object basis or the like.

The ID information 610 field is used in the same manner as that in the structure 400 of FIG. 4; ID information 610 is provided in this field to identify a particular cube or set of cubes (such as a set corresponding to an object).

The location change information 620 is provided so as to provide information about the change in location of the cube or cubes to which the data structure 600 corresponds. In some embodiments, this information 620 may be encoded by simply defining a new position for each cube; in others, a displacement of the cube may be encoded (so as to allow a new position to be calculated when considering the information included in the I frame 510. In some embodiments, a combination of these methods may be used; for example, below a particular threshold it may require less data to define the change in position than it would to define a new position. In some examples, the change of position information is encoded using an in-scene coordinate system; however, any suitable method of encoding the difference in location of the one or more cubes may be appropriate.

Changes in positions may also be defined for a group of cubes, so as to correspond to the movement of an object or the like. In some embodiments, the movement of a group of cubes may be defined in addition to smaller changes defined for any cubes (for example, corresponding to the same object) that may move by a different amount.

In some embodiments, the location change information may comprise object rotation information either in addition to or instead of movement information. For example, if a ball has been kicked then the motion of the group of cubes representing the ball could be described using a change in location of the ball in conjunction with a change of rotation as the ball spins when in flight. During an initial phase, when the ball is deformed as a result of the kick, the location of the cubes in the area of deformation could be described with additional information describing the deviation from the motion of the ball as a whole.

The cube change information 630 is used to describe if a cube has changed to a different one of the 256 possible cubes in the marching cubes algorithm. This information may be encoded as a rotation (as many of the 256 cubes are equivalent when considering rotational symmetry), a different cube being identified, or a change in interpolation values or the like that define the location of the surface in a particular cube, for example.

Additional change information 640 may be provided that describes any further information about a change in the cubes described by the structure 600. For example, a change of resolution could be defined here (for example, a field that relates newly-identified cubes to be recognised as replacing existing cubes in a previous frame or the like). Alternatively, or in addition, a change in colour or texture information may be described here. In some embodiments, the presence of new cubes (such as when a new object enters a scene) may also be identified in the additional change information 640. This identification could assist a processing device in identifying unrecognised ID information 610 as corresponding to new objects, for example.

As noted above, the viewpoint of the viewer may be considered when transmitting image or video content for display. In addition to this, it may be considered that an expected (or actual, if encoding is sufficiently fast so as to be performed in real-time) viewpoint may be used when generating the content. The requested viewpoint may be input by a user with a controller, for example, or by considering a user's head position and orientation when using an HMD as the display device for the video or image content.

An expected viewpoint may be obtained from prediction based upon a user's head motion, for example. Alternatively, or in addition, the prediction may be based upon the content; for example, a user may be expected to view a particular object or person in a scene (such as following the ball in a sports video, or a main actor in a movie scene) or to move their heads in the perceived direction of origin of a sound.

When considering the viewpoint of the user, it may further be possible to identify a region of interest within the viewpoint. This may be identified by considering the most important object in the image (for example, a main actor in a scene) or by using gaze detection in an HMD arrangement, for example. In some embodiments, video or image content may be encoded to represent the most common regions of interest; information identifying these may be obtained by performing gaze detection or the like on a sample group of people before encoding. The regions that are focussed upon by this group may be considered to be regions of interest within the scene, and content may be encoded to reflect this.

FIG. 7 schematically illustrates a scene 700 generated in a manner analogous to foveal rendering techniques, so as to provide higher-quality representations of regions that are likely to be of particular interest to a viewer.

Of course, the two methods are not necessarily equivalent; in standard foveal rendering techniques it is common to retrieve high-resolution regions from a first image and low-resolution regions from a second image and combine them to generate an image for display. In the arrangement described in this document, other methods may be used to provide high quality regions and low quality regions; examples of such methods are described below with reference to FIGS. 8 and 9.

Such methods may be advantageous in that the amount of data required to represent an image for display is reduced without a large impact on the viewer's viewing experience. For example, the resolution of an image generated from the encoded data may be lower only in portions of the image which a viewer is not focussed on. As a result, the viewer is less likely to be aware of such a change in image quality.

In the scene 700 of FIG. 7, a high quality representation of an object 710 is provided in the centre of the scene 700. The object 710 is within a region 720, which is considered to be a region of interest for a user (which may be identified in any of the manners described above). For example, the region of interest may be so defined so as to represent the centre of the viewpoint (as this is a comfortable viewing position for the user). Alternatively, or in addition, the tree 710 may be identified as being an important object (either in the context of the content, or because of its relative size in the scene 700, for example), or a noise could be coming from the tree 710 (such as a bird in the tree 710) that would identify the tree 710 as being an object of interest.

Objects 730 (which are trees similar to the object 710) which appear outside of the region 720 are presented with a lower-quality representation than the object 710. This is apparent from the blockier appearance, which is intended to illustrate a lower-quality model. These objects 730 may be considered to be relatively uninteresting in the scene 700 as they appear in the background, and are smaller than the tree 710, for example.

Figure 8:
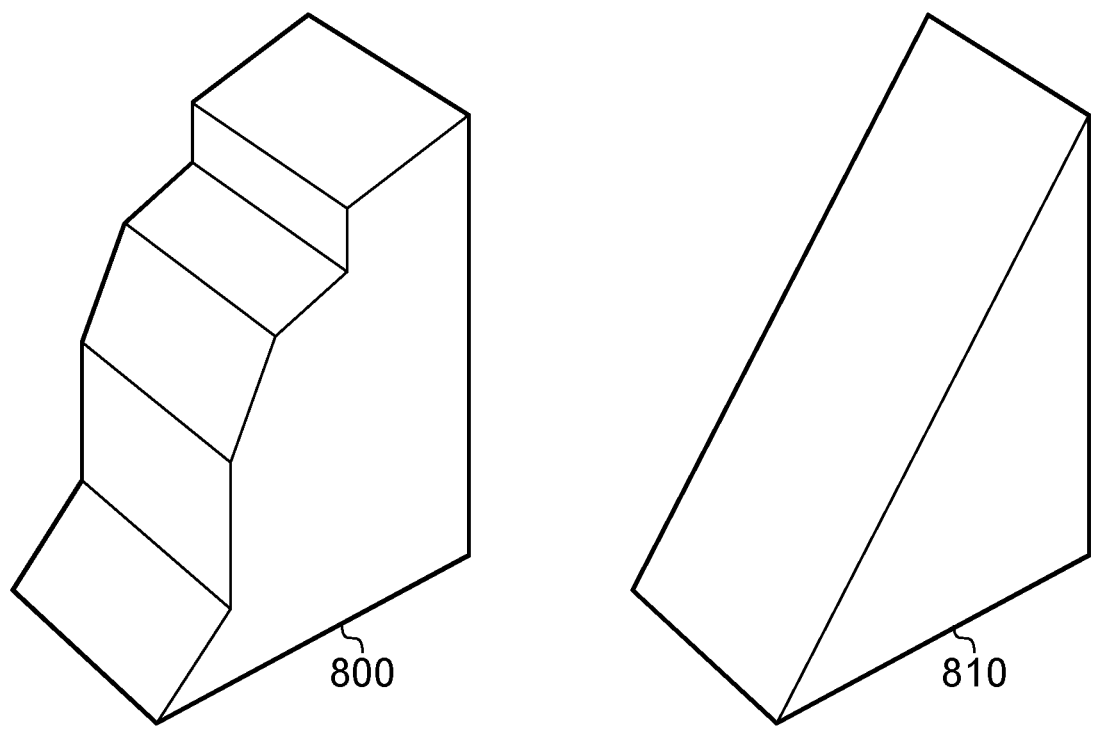
FIG. 8 schematically illustrates high and low quality object representations.

FIG. 8 schematically illustrates a more detailed example of a possible difference between low quality representations and high quality representations of an object.

The object 800 corresponds to a higher-quality representation, and comprises a number of different surfaces that give the object 800 a relatively complex shape. The object 810 corresponds to a lower-quality representation of the object 800. It is clear that this is a lower-quality representation because much of the detail of the original object 800 is lost; instead of the complex shape of the slope, a single line is provided that links the corners.

This difference in quality of representation may be provided in any number of ways, such that any suitable method may be selected as is appropriate for a particular application.

In some embodiments, the interpolation applied to the models is omitted. This interpolation (as described above) is used to define the intersection point of the surface with an edge (or surface) of each cube—this may therefore act as a modifier to be used in conjunction with a definition of a particular cube. This may be advantageous in that less data is stored and/or transmitted, with the drawback of having a smaller range of angles available to describe the change in angle between different surfaces.

Figure 9:
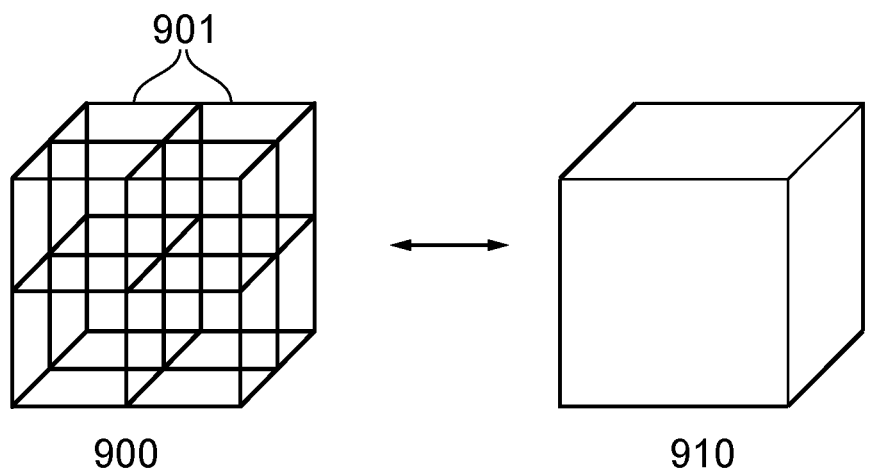
FIG. 9 schematically illustrates different sized cubes.

In some embodiments, the size of the cubes is increased; this is analogous to decreasing the resolution of the grid of cubes that are used to represent the environment. FIG. 9 schematically illustrates this process. Such a process may be performed on a portion of the environment or scene, and for any number of frames in the case of video content, including the whole environment or scene.

In FIG. 9, a cube 900 that comprises eight component cubes 901 may be replaced with the cube 910. When the marching cubes algorithm is used, the cube 910 comprises a single surface that approximates the surface defined by the cube 900. The surface defined by the cube 900 is comprised of up to eight separate surfaces that are defined by the eight component cubes 901 respectively.

It is clear that the surface in the cube 910 comprises less information than the (up to) eight surfaces in the cube 900; thus the amount of detail that is provided is reduced. As only a single cube is used, rather than eight, the amount of data that is used may be reduced by as much as 87.5% in some embodiments.

This process may be repeated, such that eight cubes 910 could be combined into a cube that is larger yet; this, of course, results in a further loss of detail. It should also be noted that the combination of eight cubes into one should not be regarded as limiting; any number of cubes may be combined into a larger cube.

Of course, this process may be performed in reverse if further information about the surface is available; a cube such as the cube 910 could be divided into eight (or any suitable number of) cubes such as the cubes 901 so as to increase the level of detail used to represent the surface.

In some embodiments, two or more files may be stored that each correspond to the same scene. This allows a composite file to be generated for transmission (and/or storage) that comprises both low and high quality regions by selecting a cube resolution for each area. In this manner, data representing a view with areas of different quality, such as that in FIG. 7, may be generated. In this description, 'file' may be taken to more generally mean a set of data (such as an associated set of data that may be comprised of multiple files).

For example, a low quality representation of a piece of content could be selected as a default file for transmission, but one or more cubes in this file may be replaced with cubes from a file representing a higher quality representation in the manner described with reference to FIG. 9.

The level of detail that is used for a portion of image (which here corresponds to the number of cubes used to represent surfaces in this portion) may be determined in dependence upon a priority value assigned to that portion of the image. For example, high priority cubes could be identified as those that define the surface of an object of interest.

Similarly to detecting a region of interest, the priority value assigned to cubes (or groups of cubes) may be determined in dependence upon context information or gaze detection or the like.

A user profile may be maintained that identifies preferred 'types' of cubes so as to further refine the definition of high priority cubes. For example, a user's favoured colours or types of objects may be recorded so as to be able to identify when a user's interest is likely to be piqued. These may be input manually by a user, or they may be recorded by monitoring gaze detection and/or performing EEG (electroencephalogram) measurements to determine a user's reaction to particular image elements.

These preferences, in conjunction with viewpoint information, may be used to generate a data stream that is reduced in size such that storage and transmission may be more efficient. Alternatively, or in addition, these preferences and/or the viewpoint information may be used to select a single file from amongst a plurality of files that are generated for a piece of content. In an embodiment in which multiple files are stored the advantages in terms of the storage of the content may be diminished; however the advantages of a smaller file size when transmitting the data may still be appreciated.

Such an advantage may be recognised in embodiments in which data is being streamed from a server, for example. Alternatively, or in addition, the advantages may be appreciated in arrangements in which a plurality of files are stored (or a single, larger file) at a processing device and a single viewpoint to be viewed is transmitted to an HMD, for example. In some embodiments, a file may be stored that describes the cubes for representing a whole scene. This file may be supplemented with additional files in order to generate an image suitable for display to a user; these additional files may comprise information about motion of objects, for example, in order to generate video content.

Alternatively, or in addition, the additional files may comprise information that describes regions of the scenes in more detail. For example, the additional files may comprise information about a plurality of cubes that are to replace one or more cubes that are used to describe the scene in the initial file.

Figures 10, 11:
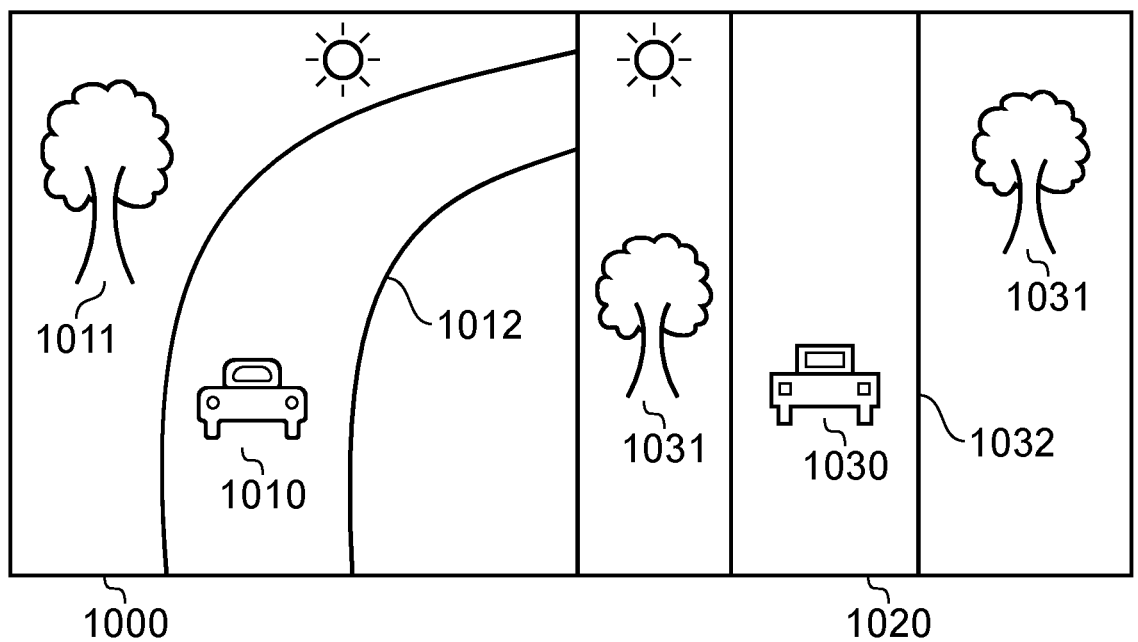
FIG. 10 schematically illustrates a multiplayer game.
FIG. 11 schematically illustrates files provided to a player of a game.

FIG. 10 schematically illustrates a split-screen multi-player game being played, comprising a first player's screen 1000, a first player-controlled object 1010, a second player's screen 1020, and a second player-controller object 1030. In this example, a racing game is being played in which both players are competing on the same track.

In general, when playing multiplayer games, information representing a separate viewpoint is generated for each player. This means that each player, using images rendered using the generated information, is able to view their own controllable object within the virtual environment separately to that of the other players.

In some examples, a single file is provided to the players that describes the virtual environment (in this case, the race track) using a low-quality representation; in the case of a non-local multiplayer embodiment, each player may be provided with the same file separately. An additional file is then generated for each player that refines the file describing the whole environment by providing higher-quality data for that particular player's viewpoint.

In the example of FIG. 10, the single file may comprise lower-quality data (using larger cubes, for example) for every object in the virtual environment; this includes the track, the trees, and the sun. The vehicles 1010 and 1030 may or may not be present in this data.

The higher-quality data (using smaller cubes, for example, or better interpolation) would comprise data relating to the player's view specifically; the player with the view 1000 would be provided with higher-quality data for the vehicle 1010, tree 1011 and track portion 1012, whilst the player with the view 1020 would be provided with the higher-quality data for the vehicle 1030, trees 1031 and track portion 1032.

Of course, it is not essential to provide higher-quality data for every object in the viewpoint. For example, higher-quality data for the sun for each viewpoint may or may not be provided; the players are unlikely to ever focus on the sun (due to brightness, distance from the car, and lack of possible interaction, for example), and as a result it may not be considered useful to include the higher-quality data.

Such an implementation for multiplayer gaming may be particularly advantageous in arrangements in which multiple HMDs are used with a single processing device, or if multiple systems are used to play a game that is being executed on a remote server, as the amount of data required per-viewpoint may be reduced.

FIG. 11 schematically illustrates two files that may be provided to each player. A first file 1100 comprises scene information, whilst a second file 1110 comprises viewpoint-specific information for a viewer.

Each of the files 1100 and 1110 may be provided in accordance with the data structures of FIGS. 4 and 6 as appropriate, for example. Whilst it is shown that one of each of the files 1100 and 1110 is provided, any number may be provided. For example, the scene information 1100 could be provided once for each scene, and updated only when there is a change of scene (such as racing on a new track) or when the virtual environment is modified (such as a player crashing into a tree, causing the tree to fall over).

The file 1110 may be provided as often as is suitable; in general, it is suitable to provide a file 1110 every time the player or an object moves or at a suitable frequency so as to allow display with an appropriate frame rate.

As noted above, the scene information 1100 may comprise lower-quality data for a whole virtual scene, or at least a suitably large portion of the scene such that the virtual environment in which the player is likely to occupy is included.

The viewpoint information 1110 comprises higher-quality information about the surfaces that are present in a corresponding player's viewpoint. This may comprise information to replace that in the scene information 1100 (such as replacing a single cube in the scene information 1100 with a plurality of cubes in the viewpoint information 1110, for example using the method described with reference to FIG. 9).

Alternatively, or in addition, the viewpoint information 1110 may comprise data corresponding to player- or viewpoint-specific objects. An example of this is the vehicles 1010 and 1030 in FIG. 10; these vehicles move frequently, as they are player-controlled, and as such including them in the scene information 1100 may be inefficient as it may require the scene information 1100 to be updated much more frequently than it otherwise would be. In addition, player-controller objects (such as the cars) are not present in the environment in all cases; they are not a part of the default track and vary in dependence upon user selections.

In embodiments in which player-specific content is provided to a user in the viewpoint data 1110, it should be appreciated that data may be acquired from more than one source.

For instance, in the context of FIG. 10 it may be the case that the viewpoint-specific information about the track is acquired from a file describing a high quality representation of the track, while information describing the cars 1010 and 1030 are acquired from a separate file that describe selectable vehicles in the game.

In some embodiments, two pieces of viewpoint information 1110 may be provided to a user; one corresponding to each of the user's eyes. This may be advantageous in that this may allow a different image to be generated for each eye with a reduced processing requirement at the display and/or processing unit, such that stereoscopic images may be generated effectively. This may be particularly advantageous in an arrangement in which an HMD or another device operable to display stereoscopic image data is used as the display device.

Of course, information about each eye's view may be included in a single file, or it may be possible to derive a correct view for each eye from the viewpoint information 1110 even if it only relates to a single viewpoint, for example by applying a pixel shift to an image generated using the file.

Figure 12:
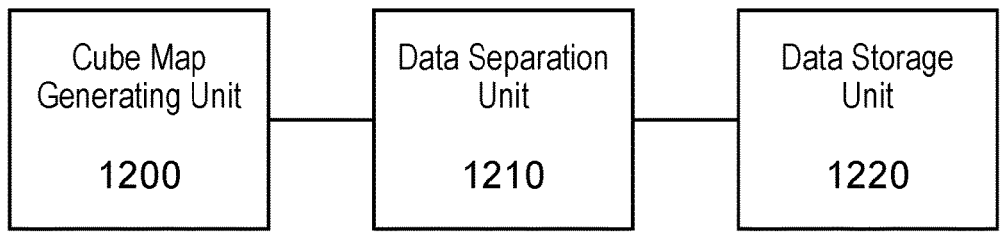
FIG. 12 schematically illustrates a data generation and storage apparatus.

FIG. 12 schematically illustrates a data generation and storage apparatus according to the present disclosure.

A cube map generating unit 1200 is operable to generate a cube map, representing a virtual scene or the like, using the marching cubes algorithm. In the present disclosure, the term 'cube map' is used to refer to a set of information generated in accordance with the marching cubes algorithm. For example, a cube map may comprise information defining a set of cubes in addition to information locating that set of cubes relative to one another (or locating them in absolute terms).

A data separation unit 1210 is operable to divide the generated data into two or more sets of data. This may comprise the division of the generated cube map into one or more files that are suitable for transmission to a processing and/or display device, for example. These two or more sets of data may comprise data representing the same content at different levels of quality, for example, or the two or more sets of data may comprise data representing different objects within the content.

A data storage unit 1220 is operable to store the data output by the data separation unit 1210.

Figure 13:
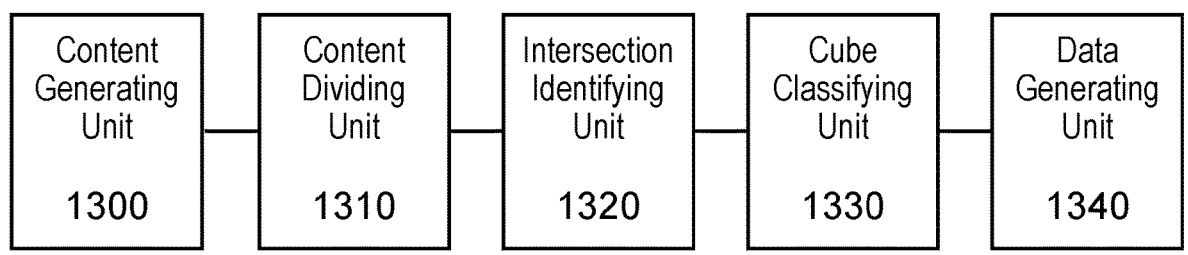
FIG. 13 schematically illustrates a cube map generating unit.

FIG. 13 schematically illustrates a cube map generating unit 1200. The cube map generating unit 1200 comprises a number of distinct units that each provide different functionality, although the functions of each may be combined as appropriate.

A content generating unit 1300 is operable to generate content in the form of an image or a virtual scene/environment. For example, the content may be an image, a frame from a piece of video content, or a virtual environment. Such content may be generated in any suitable manner, so long as it is possible to perform processing to characterise the surfaces of objects within the content. For example, content may be generated using mesh and texture information for a scene/environment.

Of course, pre-generated information could be provided from another source and as such the generation of content in this manner may be omitted in some embodiments. In these embodiments, the pre-generated information is used instead of the content generated by the content generating unit 1300 by the data generation and storage apparatus.

While described in terms of image frames and virtual scenes/environments, such a process may be performed for objects in isolation. For example, user-selectable vehicles in the example discussed with reference to FIG. 10 may be generated as standalone images as they may not be associated with a particular environment.

A content dividing unit 1310 is operable to divide the content generated by the content generating unit 1300 into a plurality of cubes suitable for providing a basis for performing a marching cubes-style processing as described above. Here, the generated image may be an image with associated depth data, or it may refer to a virtual environment or the like. Each of these cubes may be assigned an identification number or the like, or a map may be generated, such that individual cubes may be identified within the content.

An intersection identifying unit 1320 is operable to detect intersection information that describes the intersection of one or more surfaces within the content with the plurality of cubes. In other words, the intersection identifying unit 1320 is operable to identify cubes that are intersected by surfaces within the generated content, and may be operable to detect the point at which the surface intersects an edge of a cube. This may be performed in any suitable manner, such as using image analysis or by comparing data about the position and size/shape of objects in the generated content with information about the location of the cubes defined in by the content dividing unit 1310.

A cube classifying unit 1330 is operable to classify each of the cubes in dependence upon the intersection information, the classification indicating the properties of the surface within the respective cubes. For example, the cube classifying unit 1330 may be operable to classify each cube as one of the 256 possible cubes identified by the marching cubes algorithm (as described above). Alternatively, the classification may comprise an identification of one of the 15 unique cubes illustrated in FIG. 3 in addition to any appropriate rotation/orientation information.

The cube classifying unit 1330 may also be operable to utilise information from the intersection identifying unit 1320 in order to generate interpolation information from the intersection information and include this in the classification. Alternatively, or in addition, any other data may also be generated that refines the classification so as to provide a more accurate representation of the surfaces in the generated image.

A data generating unit 1340 is operable to generate data comprising the cube position information and the cube classification information. For example, the data generating unit 1340 may be operable to generate a data file that includes information identifying each cube within the content, in addition to information about the cube as generated by the cube classifying unit 1330.

The data generating unit 1340 may be operable to generate content in dependence upon a user's viewpoint within the content; as described above, this may use predicted, expected, or real-time viewpoint or gaze information in order to generate content with a quality that varies in different areas of the content.

Of course, in the case that a marching tetrahedra (or other alternative) algorithm is used the content dividing unit 1310 is operable instead to divide the content into the appropriate polyhedra. The operation of the other units may be modified accordingly, in such cases; for example the cube classifying unit 1330 may instead be utilised as a tetrahedron classifying unit.

Figure 14:
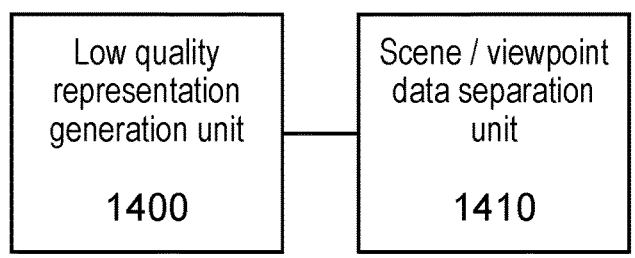
FIG. 14 schematically illustrates a data separation unit.

FIG. 14 schematically illustrates a data separation unit 1210. The data separation unit 1210 may not be utilised in all embodiments, as in some embodiments only a single file is provided (for example, video content at a fixed quality). Alternatively, each of the units comprising the data separation unit 1210 may be used either separately or in succession.

A low quality representation generation unit 1400 is operable to generate one or more sets of data corresponding to that output by the cube map generating unit 1200, each set of data corresponding to a corresponding lower-quality representation of the original content. For example, a plurality of cubes in the cube map may be combined so as to effectively lower the resolution of the map in one or more areas. Each of the sets of data that are generated may relate to a different quality level, or use different techniques so as to reduce the quality; for example, one may combine cubes from the original version while another may omit interpolation data.

The data separation unit 1210, using the low quality representation generation unit 1400, is therefore operable to represent the content using fewer polyhedra for a set of data comprising a lower level of quality. Alternatively, or in addition, the data separation unit 1210, using the low quality representation generation unit 1400, may be operable to represent the content using a reduced amount of polyhedron classification information for a lower level of quality.

A scene/viewpoint data separation unit 1410 is operable to extract or otherwise separate the cube map data output by the cube map generating unit 1200 into separate sets of data for the scene (background objects, or the like) and viewpoint specific content (such as generally occluded objects or player-controllable objects in an environment) in line with the description referencing FIGS. 10 and 11.

In some embodiments, the scene/viewpoint data separation unit 1410 is operable to utilise information associated with the content in order to identify which objects should be presented in which set of data. Alternatively, or in addition, the scene/viewpoint data separation unit 1410 may be operable to identify high priority objects using associated data (as described above), and separate objects based upon this. For example, high priority objects may be preferentially stored in viewpoint data rather than scene data.

The data separation unit 1210, using the scene/viewpoint data separation unit 1410, is therefore operable to generate the sets of data in dependence upon a priority value assigned to the objects within the content. For example, a first set of data may comprise data that is required by all players of a multiplayer game, while additional sets of data each correspond to a respective viewpoint of each player of the multiplayer game, such that a player is to be provided with the first set of data and a corresponding additional set of data for displaying the content.

Figure 15:
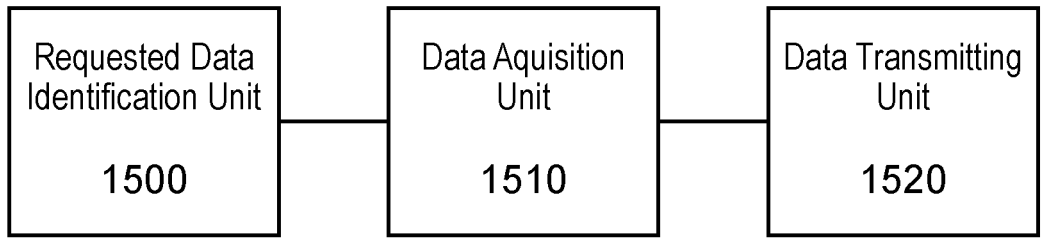
FIG. 15 schematically illustrates a data identifying and transmitting unit.

FIG. 15 schematically illustrates a data selection and transmission arrangement. This arrangement is operable to select data that is required by a user to generate an image for display, and to transmit this to the user. Of course, in the case that the data is stored on a processing device that is used to generate images for display this transmission may be instead regarded as a retrieval of information.

A requested data identification unit 1500 is operable to identify the data that is requested by a user. For example, this may comprise the using of information about a user's in-game status (such as which level or in-game area they are in), viewpoint (such as a virtual avatar's orientation, or the real-world position/orientation of the HMD), and/or user preferences.

A data acquisition unit 1510 is operable to acquire the information that is identified by the requested data identification unit 1500. In some embodiments, this comprises selecting a file corresponding to an appropriate-quality representation of the content.

In some embodiments, an appropriate scene information file is acquired. Alternatively, or in addition, a viewpoint-specific file may be selected for the user. In some embodiments, portions of data corresponding to particular objects or regions of a virtual environment may be selected. For example, it may be determined that it is not necessary to provide a user with the full scene information (particularly true in large virtual environments in which a user is not expected to travel much); in such examples, only a portion of the scene information file may be acquired.

Of course, if the files corresponding to the identified information are not available then they may be requested by the data acquisition unit and the data generation arrangement of FIG. 12 may be operable to generate the desired data in response to such a request.

A data transmitting unit 1520 is operable to transmit the data that is acquired by the data acquisition unit 1520. In some examples, this may comprise transmission from a server to a local processing unit. In other examples, this may comprise transmission from a processing device to a display device, such as an HMD.

Figure 16:
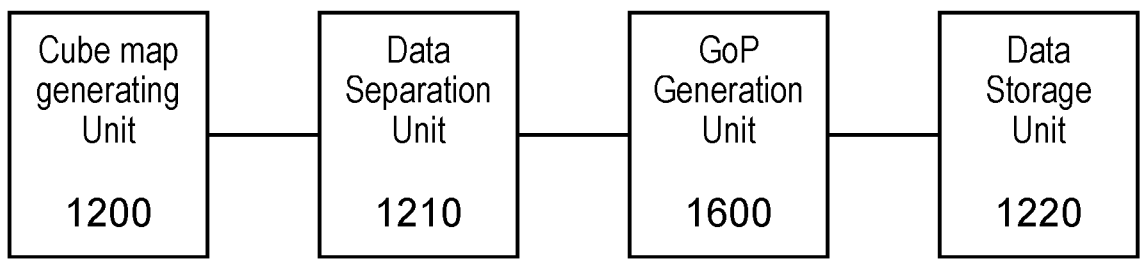
FIG. 16 schematically illustrates a video encoding unit that encodes video content using cube maps.

FIG. 16 schematically illustrates a video encoding unit that encodes video content using cube maps.

This apparatus comprises a cube map generating unit 1200, data separating unit 1210 and a data storage unit 1220 that function similarly to the equivalent units described with reference to FIG. 12.

In addition to these units, the arrangement of FIG. 16 comprises a group of pictures (GOP) generation unit 1600. The GOP generation unit 1600 is operable to generate frames of cube map information such as those discussed with reference to FIGS. 4-6; that is to say, content is generated that uses key frames and predicted frames to store the generated data.

The GOP generation unit 1600 may be operable to select one or more keyframes from amongst the plurality of frames relating to a piece of content, and then compare the other frames to these keyframes. Using the results of the comparison the GOP generation unit 1600 is able to generate difference information, and then use this difference information to generate predicted frames. The predicted frames are generated so as to be able to be used, in conjunction with keyframes and/or one or more predicted frames, to generate scene representation information.

Of course, these GOPs may not be equivalent to those associated with common video playback methods; cube map data is not suitable for the playback of video as the cube maps without the inclusion of colour data and the like. Colour data (or any other suitable data) may be encoded in the frames as metadata or in a separate field, for example, or the data could be formatted such that colour data is associated with each cube in the map. Alternatively, or in addition, colour information and the like may be provided separately to the GOP structure.

Figure 17:
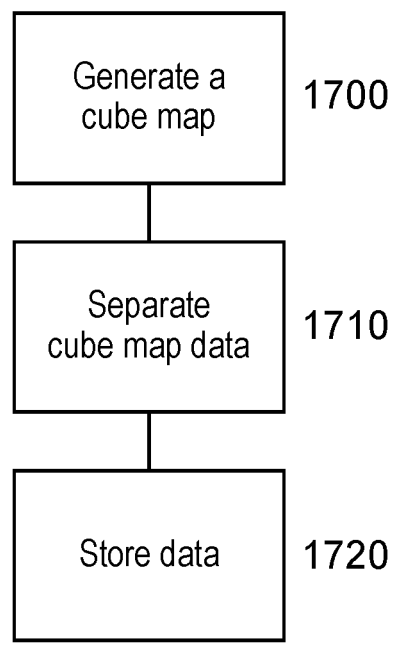
FIG. 17 schematically illustrates a data generation and storage method.

FIG. 17 schematically illustrates a data generation and storage method for generating and storing data representing content to be displayed. As described above this data may be stored using cube maps according to the marching cubes algorithm, although other similar polyhedron-based methods may also be appropriate.

A step 1700 comprises generating a cube map from a piece of content, such as a video or a virtual environment.

A step 1710 comprises separating the cube map data into two or more sets of data; for example, representing different cube map resolutions or different objects. This step may be considered optional in some embodiments, as only a single cube map may be required for the desired playback.

A step 1720 comprises storing the data generated in the previous steps 1700 and 1710.

Figure 18:
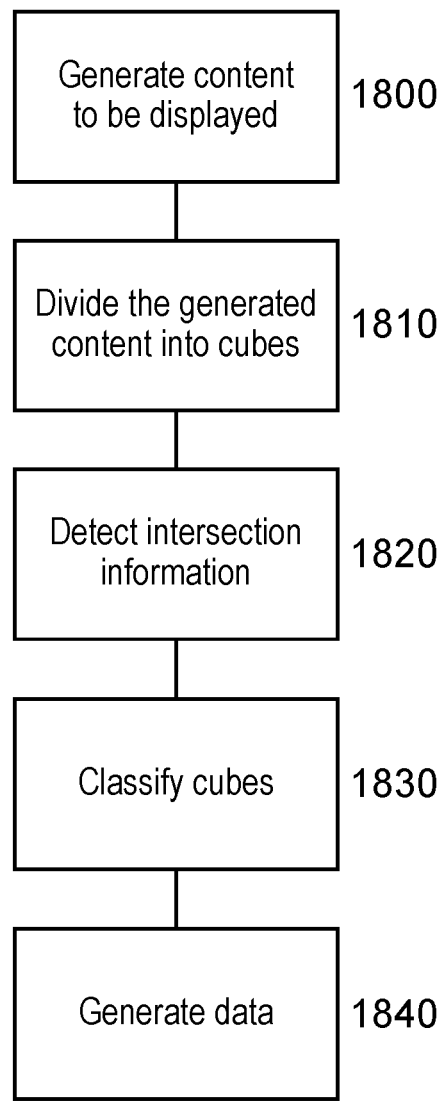
FIG. 18 schematically illustrates a cube map generation method.

FIG. 18 schematically illustrates a cube map generation method, as an example of the implementation of the step 1700 of FIG. 17.

A step 1800 comprises generating content to be displayed. This may comprise generating content from mesh and texture data, for example. In some embodiments this step may be omitted, as pre-generated content may be obtained from other sources.

A step 1810 comprises dividing the content to be displayed into a plurality of cubes, and generating polyhedron position information. As mentioned above, any polyhedra may be used instead of cubes, when implementing an alternative to the marching cubes algorithm.

A step 1820 comprises detecting intersection information that describes the intersection of one or more surfaces within the content with the plurality of cubes defined in step 1810. This comprises the identification of which edges of the cubes are intersected by the surfaces in the content. In addition to this, the point at which the surface intersects the edge may be identified; this information may be used to increase the accuracy of the cube map representation of the content.

A step 1830 comprises classifying each of the cubes defined in step 1810 in dependence upon the intersection information detected in step 1820, the classification indicating the properties of the surface within the respective cubes. For example, each cube may be identified as corresponding to a particular one of the 256 possible cubes identified by the marching cubes algorithm (as described above). Alternatively, the identification could be that of one of the 15 unique cubes illustrated in FIG. 3 in addition to any appropriate rotation/orientation information.

The step 1830 may also utilise intersection information from step 1820 in order to generate interpolation information for refining the classification data. Alternatively, or in addition, any other data may also be generated that refines the classification so as to provide a more accurate representation of the surfaces in the generated image.

A step 1840 comprises generating data comprising the cube position information and the cube classification information. For example, this may comprise outputting the cube position information and cube classification information as one or more files.

Figure 19:
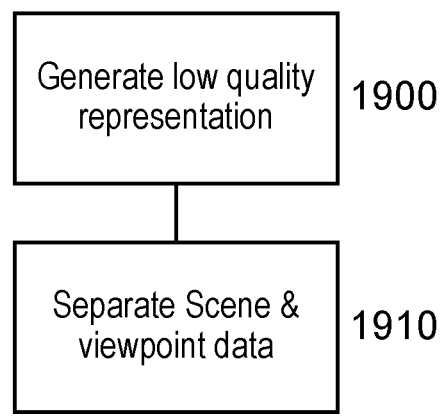
FIG. 19 schematically illustrates a data separation method.

FIG. 19 schematically illustrates a data separation method as an example of the implementation of step 1710 in FIG. 17.

A step 1900 comprises generating one or more sets of data corresponding to that generated in step 1700 of FIG. 17, each set of data corresponding to a corresponding lower-quality representation of the original content. For example, a plurality of cubes in the cube map may be combined so as to effectively lower the resolution of the map in one or more areas. Each of the sets of data that are generated may relate to a different quality level, or use different techniques so as to reduce the quality; for example, one may combine cubes from the original version while another may omit interpolation data.

A step 1910 is operable to extract or otherwise separate the data generated in step 1700 of FIG. 17 into separate files (or sets of data) for the scene (background objects, or the like) and viewpoint specific content (such as generally occluded objects or player-controllable objects in an environment) in line with the description referencing FIGS. 10 and 11.

It will be appreciated that example embodiments can be implemented by computer software operating on a general purpose computing system such as a games machine. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

It will also be apparent that numerous modifications and variations of the present disclosure are possible in light of the above teachings. It is therefore to be understood that within the scope of the appended claims, the disclosure may be practised otherwise than as specifically described herein.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A system for generating data representing content to be displayed, the system comprising:
 a content dividing unit operable to divide content to be displayed into a plurality of polyhedra and generate polyhedron position information and identification information for each of the polyhedra;
 an intersection detecting unit operable to generate intersection information that describes the intersection of one or more surfaces within the content with the plurality of polyhedra;
 a polyhedron classifying unit operable to classify each of the polyhedra in dependence upon the intersection information, the classification indicating the properties of the surface within the respective polyhedra; and
 a data generating unit operable to generate data comprising the polyhedron position information, the identification information, and the polyhedron classification information,
 wherein the respective identification information for each of the polyhedra includes sufficient data to permit at least one of: (i) identification of each such polyhedra within the content, and (ii) linkage of each such polyhedra to a respective object within a scene of the content.

2. The system according to claim 1, wherein the polyhedra are cubes.

3. The system according to claim 1, wherein the polyhedron classifying unit is operable to generate interpolation information from the intersection information and include this in the classification.

4. The system according to claim 1, comprising a data separation unit operable to divide the generated data into two or more sets of data.

5. The system according to claim 4, wherein the two or more sets of data comprise data representing the same content at different levels of quality.

6. The system according to claim 5, wherein the data separation unit is operable to represent the content using fewer polyhedra for a set of data comprising a lower level of quality.

7. The system according to claim 5, wherein the data separation unit is operable to represent the content using a reduced amount of polyhedron classification information for a lower level of quality.

8. The system according to claim 4, wherein the two or more sets of data comprise data representing different objects within the content.

9. The system according to claim 8, wherein the data separation unit is operable to generate the sets of data in dependence upon a priority value assigned to the objects within the content.

10. The system according to claim 4, wherein a first set of data comprises data that is required by all players of a multiplayer game, and additional sets of data each correspond to a respective viewpoint of each player of the multiplayer game such that a player is to be provided with the first set of data and a corresponding additional set of data for displaying the content.

11. The system according to claim 1, wherein the data generating unit is operable to generate content in dependence upon a user's viewpoint within the content.

12. The system according to claim 1, comprising a group of pictures generation unit operable to generate key frames and predicted frames to store the generated data.

13. A method for generating data representing content to be displayed, the method comprising:
 dividing content to be displayed into a plurality of polyhedra, and generating polyhedron position information and identification information for each of the polyhedra;
 generating intersection information that describes the intersection of one or more surfaces within the content with the plurality of polyhedra;
 classifying each of the polyhedra in dependence upon the intersection information, the classification indicating the properties of the surface within the respective polyhedra; and generating data comprising the polyhedron position information, the identification information, and the polyhedron classification information, wherein the respective identification information for each of the polyhedra includes sufficient data to permit at least one of: (i) identification of each such polyhedra within the content, and (ii) linkage of each such polyhedra to a respective object within a scene of the content.

14. A non-transitory, machine-readable storage medium which stores computer software, which when executed by a computer system, causes the computer system to generate data representing content to be displayed, by carrying out actions, comprising:

dividing content to be displayed into a plurality of polyhedra, and generating polyhedron position information and identification information for each of the polyhedra;

generating intersection information that describes the intersection of one or more surfaces within the content with the plurality of polyhedra;

classifying each of the polyhedra in dependence upon the intersection information, the classification indicating the properties of the surface within the respective polyhedra; and generating data comprising the polyhedron position information, the identification information, and the polyhedron classification information, wherein the respective identification information for each of the polyhedra includes sufficient data to permit at least one of: (i) identification of each such polyhedra within the content, and (ii) linkage of each such polyhedra to a respective object within a scene of the content.

* * * * *